United States Patent
Lingnau

[15] 3,698,633
[45] Oct. 17, 1972

[54] THERMAL CONTROL ELEMENT
[72] Inventor: Josef Lingnau, Bremen-Borgfeld, Germany
[73] Assignee: Gestra-KSB Vertriebsgesellschaft mbH & Co., Bremen, Germany
[22] Filed: Aug. 2, 1971
[21] Appl. No.: 168,262

[30] Foreign Application Priority Data
Aug. 1, 1970  Germany..........P 20 38 344.2

[52] U.S. Cl.................................................236/99
[51] Int. Cl..............................................G05d 23/12
[58] Field of Search.........................236/56, 58, 99

[56] References Cited
UNITED STATES PATENTS
2,084,470  6/1937  Wells..........................236/56
2,129,986  9/1938  Berghoefer..................236/58

Primary Examiner—Edward J. Michael
Attorney—Allison C. Collard

[57] ABSTRACT

A thermal control element having a stroke membrane, a shutoff means, and a counter plate. The stroke membrane is welded to the shutoff means while the counter plate is connected to the shutoff means by rivet means. Corresponding clamping faces are provided on the shutoff means and the counter plate for clamping unwelded portions of the stroke membrane therebetween.

4 Claims, 3 Drawing Figures

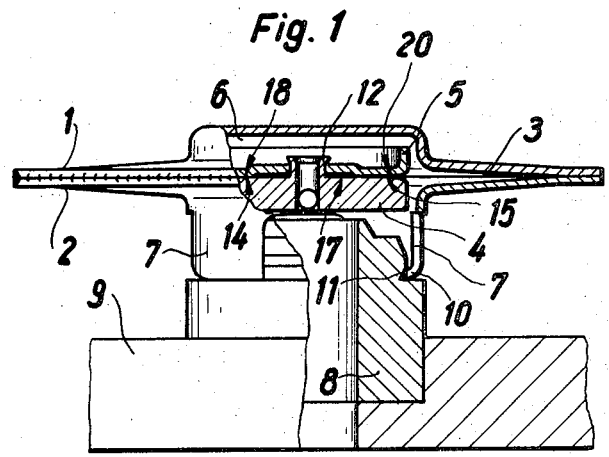
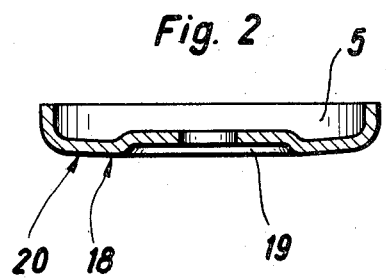
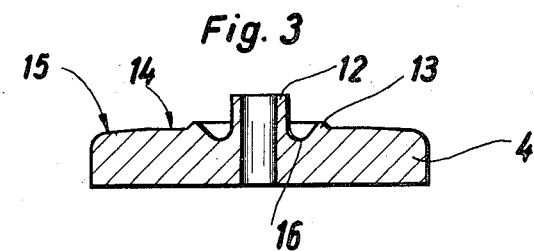
Inventor:
Josef Lingnau

THERMAL CONTROL ELEMENT

This invention relates to a thermal control element having a stroke membrane or diaphragm, and a shutoff means, the center pin of which extends through the stroke membrane and is connected by rivet means with a counter plate which is arranged on the shutoff means, the shutoff means is faced away from the face of the membrane and is also welded to the stroke membrane.

In U.S. Pat. Nos. 1,828,080, and 2,129,986, the shutoff means is clamped to the stroke membrane. The shutoff means and/or the counter plate are connected at the edge zone with the stroke membrane by means of welding or hard soldering in order to obtain absolute tightness. Due to welding or hard soldering, however, the chemical properties of the stroke membrane or diaphragm undergo a disadvantageous change in the edge zone of the welding area. Since this welding area is subjected to a constant bending stress during the stroke movement, the life span of the stroke membrane or diaphragm is relatively short.

Accordingly, the present invention improves the thermal control element of the above-mentioned type in order to prevent a premature failure of the membrane. In the present invention, the shutoff means is welded together with the stroke membrane at an annular seam which runs circumferentially in close range around the center pin. The stroke membrane is clamped between clamp faces which are provided at the shutoff means and the counter plate, thereby concentrically encompassing the welded seam. Thus, the weak welding area is completely removed from the bending area of the membrane and is no longer subjected to stress. Therefore, the life span of the stroke membrane or diaphragm is being substantially increased.

In a preferred embodiment of the invention, the shutoff means is provided with a melting off ring boss or annular boss at the weldment point during the welding operation. This eliminates the addition of material during welding, and greatly facilitates the welding operation.

In accordance with the invention, the shutoff means is provided with an annular groove which runs between the center pin and the ring or annular boss. Superfluous weld material runs off into this groove. The diameter of this groove should be preferably the same as the diameter of the ring or annular boss.

In a further embodiment of the invention, the central front face of the counter plate, which is within the annular clamping face is provided with a recess. Thus, even if the ring or annular boss doesn't completely melt off during the welding operation, the clamping of the membrane is still assured along its outer edge area.

It is therefore an object according to the present invention to provide a thermal control element having a stroke membrane and a shut-off means whereby the stroke membrane is clamped between clamp faces so as to prevent a premature failure of the membrane.

It is another object according to the present invention to provide a thermal control element which is simple in design, easy to manufacture and reliable in operation.

Other objects and features of the present invention will become apparent from the following detailed description considered in connection with the accompanying drawing which discloses the embodiments of the invention. It is to be understood however that the drawing is designed for the purpose of illustration only and not as a definition of the limits of the invention.

In the drawing, wherein similar reference characters denote similar elements throughout the several views:

FIG. 1 shows the thermal control element in a partial cross-sectional view; and, FIGS. 2 and 3 show details of the control element of FIG. 1.

Referring to the figures, the thermal control element comprises at least two rigid wall portions 1 and 2 and a stroke membrane or diaphragm 3 which is clamped between the two rigid wall portions 1 and 2. The thermal control element further comprises a shut off means 4 and a counter plate 5. Wall portion 1 together with stroke membrane or diaphragm 3 forms a receiving space 6 for the heat expansion material, while the wall portion 2 is provided with spreadable or yieldable arms 7 which concentrically encompass a valve seat bushing or sleeve 8. The valve seat bushing 8 is fixedly mounted in a wall 9 of a valve housing (not shown). Yieldable arms 7 are provided with retaining shoulders 10 which engage a circumferential annular groove 11 of the valve seat bushing 8, thereby adjusting and fixing the control element during its operation.

As can be seen from FIG. 3, shut off means 4 is provided with a cylindrical center pin 12, an annular boss 13 encompassing the center pin, and a clamping face 14 on the outer annular area of the shut off means.

The edge zone 15 of shut off means 4 is beveled and serves as an additional support face for the stroke membrane in its open position. A circumferential groove 16 runs between the center pin 12 and annular boss 13. The connection between shut off means 4, stroke membrane or diaphragm 3 and counter plate 5 is done in the following manner:

Stroke membrane 3, which has a central opening for center pin 12, is mounted onto shut off means 4. When resistance heat is applied in the range of annular boss 13, stroke member 3 and shut off means 4 are welded together. Thus, annular boss 13 melts off completely and creates an absolutely tightly welded seam. The superfluous weld material is received by groove 16. Thereafter, counter plate 5, which is provided with a central opening, is mounted onto center pin 12. The free end of center pin 12 is flanged so that shut off means 4, stroke membrane 3, and counter plate 5 are fixedly riveted to each other.

In order to obtain a safe clamping of stroke membrane 3 to relieve annular weld seam 17 from bending stresses, counter plate 5 (see FIG. 2) is provided with an annular clamping face 18 which corresponds with clamping face 14 of shut off means 4. The central portion of the counter plate front face which is within clamp face 18 is provided with a recess 19, so that a safe rigid clamping of stroke membrane 3 is assured, in case annular boss 13 does not completely melt off. The edge portion 20 of the counter plate 5 also has an inclined slope and serves as an additional support face for stroke membrane 3 in the closed position.

While only a few embodiments of the present invention have been shown and described, it will be obvious that many changes and modifications may be made thereunto without departing from the spirit and scope of the invention.

What is claimed is:

1. A thermal control element which comprises;
a stroke membrane having an opening,
a shutoff means having a center pin extending through the opening of said stroke membrane,
a clamping face on the outer annular area of said shutoff means adjacent to said stroke membrane, and
a counter plate connected by rivet means to the center pin of said shutoff means and oppositely arranged on said shutoff means, said counter plate having a clamping face corresponding to the clamping face of said shutoff means, and an annular weld seam running in close range circumferentially around said center pin where said shutoff means and said stroke membrane are welded together, whereby said stroke membrane is clamped between said clamping faces of said shutoff means and said oppositely arranged counter plate concentrically encompassing said annular weld seam.

2. The thermal control element as recited in claim 1, wherein said shutoff means further comprises an annular boss encompassing said center pin which is melted off during the welding operation.

3. The thermal control element as recited in claim 2, wherein said shutoff means further comprises an annular groove running circumferentially between said center pin and said annular boss whereby excess welding material is received by said annular groove.

4. The thermal control element as recited in claim 3, wherein said counter plate further comprises a recessed central portion within the clamping face of said counter plate, whereby a rigid clamping of said stroke membrane is assured in case the annular boss of the shutoff means is not completely melted off.

* * * * *